United States Patent
Graham et al.

(10) Patent No.: US 6,871,213 B1
(45) Date of Patent: Mar. 22, 2005

(54) SYSTEM AND METHOD FOR WEB CO-NAVIGATION WITH DYNAMIC CONTENT INCLUDING INCORPORATION OF BUSINESS RULE INTO WEB DOCUMENT

(75) Inventors: Charles Graham, Hillsborough, CA (US); Erik Hartmann, Stanford, CA (US); Joe Lee, San Francisco, CA (US); Thomas Kris Masotto, Burlingame, CA (US); Mark Giuseppe Tacchi, Redwood City, CA (US)

(73) Assignee: Kana Software, Inc., Menlo Park, CA (US)

( * ) Notice: Subject to any disclaimer, the term of this patent is extended or adjusted under 35 U.S.C. 154(b) by 331 days.

(21) Appl. No.: 09/689,500

(22) Filed: Oct. 11, 2000

(51) Int. Cl.[7] .............................................. G06F 15/16
(52) U.S. Cl. ....................... 709/205; 709/203; 709/204; 709/217; 709/219
(58) Field of Search ................................ 709/203–206, 709/217–218, 223–224, 227, 229

(56) References Cited

U.S. PATENT DOCUMENTS

| | | | |
|---|---|---|---|
| 5,861,883 A | | 1/1999 | Cuomo et al. ............... 345/326 |
| 5,862,330 A | | 1/1999 | Anupam et al. ....... 395/200.34 |
| 5,918,013 A | | 6/1999 | Mighdoll et al. ...... 395/200.47 |
| 5,944,791 A | | 8/1999 | Scherpbier ................... 709/218 |
| 5,951,643 A | * | 9/1999 | Shelton et al. .............. 709/227 |
| 5,960,442 A | | 9/1999 | Pickering |
| 5,991,796 A | | 11/1999 | Anupam et al. ............ 709/206 |
| 6,003,143 A | | 12/1999 | Kim et al. |
| 6,070,185 A | | 5/2000 | Anupam et al. ............ 709/204 |
| 6,077,312 A | | 6/2000 | Bates et al. |
| 6,108,687 A | * | 8/2000 | Craig .......................... 709/204 |
| 6,138,139 A | | 10/2000 | Beck et al. |
| 6,177,932 B1 | * | 1/2001 | Glades et al. ................ 707/200 |
| 6,295,550 B1 | * | 9/2001 | Choung et al. ............. 709/204 |
| 6,345,300 B1 | * | 2/2002 | Bakshi et al. ............... 709/229 |
| 6,346,952 B1 | | 2/2002 | Shtivelman |
| 6,360,250 B1 | * | 3/2002 | Anupam et al. ............ 709/204 |
| 6,393,015 B1 | | 5/2002 | Shtivelman |
| 6,411,989 B1 | * | 6/2002 | Anupam et al. ............ 709/204 |
| 6,446,109 B2 | * | 9/2002 | Gupta ......................... 709/203 |
| 6,487,195 B1 | * | 11/2002 | Choung et al. ............. 370/352 |
| 6,505,233 B1 | * | 1/2003 | Hanson et al. .............. 709/204 |
| 6,535,492 B2 | | 3/2003 | Shtivelman |
| 6,606,708 B1 | * | 8/2003 | Devine et al. ................. 707/10 |
| 6,654,786 B1 | * | 11/2003 | Fox et al. .................... 709/203 |
| 6,668,273 B1 | * | 12/2003 | Rust ............................ 709/204 |
| 6,675,216 B1 | * | 1/2004 | Quatrano et al. ........... 709/229 |

OTHER PUBLICATIONS

Jacobs et al, "Filling HTML Forms Simultaneously : CoWeb—Architecture and Functionality", Computer Networks and ISDN Systems, NL, North Holland Publishing, Amsterdam, vol. 28, No. 7–11, pp. 1385–1395, May 1996.*

Weiss, A., Internet World, "Tips & Techniques, Tricks with Script Behold, Document.write," http://www.internetworld.com/daily/tips/1998/04/0901–docwrite.html, pp. 1–4, downloaded Jul. 19, 2000.

* cited by examiner

Primary Examiner—Hosain Alam
Assistant Examiner—Philip B. Tran
(74) Attorney, Agent, or Firm—Fenwick & West LLP (57) ABSTRACT

A method and system for exchanging information over a communications network are described. According to one embodiment, an exemplary method of the invention includes connecting two or more clients to a proxy over the communications network, activating a shared session between the clients, and enabling co-navigation of one or more web documents with dynamic content by the clients during the shared session.

30 Claims, 10 Drawing Sheets

SYSTEM AND METHOD FOR WEB CO-NAVIGATION WITH DYNAMIC CONTENT INCLUDING INCORPORATION OF BUSINESS RULE INTO WEB DOCUMENT

BACKGROUND OF THE INVENTION

1. Field of the Invention

The present invention relates to providing communications between users over a network. More particularly, the present invention relates to a system for providing co-navigation of web documents with dynamic content.

2. Background Information

Today, people may jointly browse the same web site while being miles away from each other. For instance, a customer and a customer service representative located remotely from each other may jointly view online product demonstrations, fill out forms on the Internet, or walk through online transactions. However, existing co-browsing services that provide these joint online activities have some deficiencies. Typically, the available co-browsing systems fall short because they are based on "URL pushing," a technology that allows users to "co-browse" a web page by allowing one user to send (i.e., f"push") this web page to a browser of another user.

URL Pushing works well with static web content, but because of failures inherent in its architecture, URL pushing has trouble handling dynamic web content. In addition, URL pushing does not allow the participants of the co-browsing session to interact with each other in real time. For instance, the users may not simultaneously go from one web page to another by simply entering a new URL or clicking on a link in the web page. Instead, when one wishes to access a different web page, this participant must change the location of the other browser by "pushing" the new URL to the other participant. Similarly, the users cannot jointly complete a web form in real time. That is, when text is entered into a web form, this text is not displayed to the other participant until the first participant pushes the web page with the text to the other user. When submitting a web form using URL pushing technology, often the web site records duplicate transactions. For example, if a customer buys a computer during a URL pushing-based session with a customer service representative, two or more computer orders would be submitted to the company web site.

Another problem arises when a web page to be co-browsed has dynamic content, i.e., content that may change each time it is viewed depending on the user input or cookies. Dynamically generated web pages, which are used by most web sites, may be created using Perl, ASP, Cold Fusion, Servlets, WebObjects, Broadvision, etc . . . URL pushing technology does not support dynamically generated web pages, as those pages show different information for the same URL. Similarly, URL pushing does not support cookies that are used by many web sites to create customized web pages based on the user's past preferences and to keep track of the user's movements within the web site. Furthermore, the URL pushing technology fails to support personalized sections of a web site, i.e., sections requiring a user to enter the user name and password to log in. As a result, web pages with personalized content cannot be displayed on multiple browsers. Accordingly, companies cannot use existing co-browsing services based on URL pushing—unless they are willing to remove such functionality from their web sites. Thus, the currently available co-browsing systems do not provide sufficient functionality due to the limitations of the URL pushing technology.

Therefore, it would be advantageous to create an alternative co-browsing mechanism, which will provide synchronized, interactive co-navigation of dynamic web pages without imposing limitations on technologies used by companies in creating the web pages.

SUMMARY OF THE INVENTION

A method and system for exchanging information over a communications network are described. According to one embodiment, an exemplary method of the invention includes connecting two or more clients to a proxy over the communications network, activating a shared session between the clients, and enabling co-navigation of one or more web pages with dynamic content by the clients during the shared session.

BRIEF DESCRIPTION OF THE DRAWINGS

The present invention is illustrated by way of example and may be better understood by referring to the following description in conjunction with the accompanying drawings, in which like references indicate similar elements and in which.

DETAILED DESCRIPTION OF AN EMBODIMENT OF THE PRESENT INVENTION

A method and system for exchanging information over a communications network are described. In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory.

These algorithmic descriptions and representations are the means used by those skilled in the data processing arts to most effectively convey the substance of their work to others skilled in the art. An algorithm is here, and generally, conceived to be a self-consistent sequence of processing blocks leading to a desired result. The processing blocks are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Overview

The present invention provides a method and apparatus for "co-navigating" web pages by two or more clients. Co-navigation may include jointly viewing online product demonstrations, filling out web forms, cycling through online transactions, and any other joint online activity of two or more remotely located clients.

Figure 1:
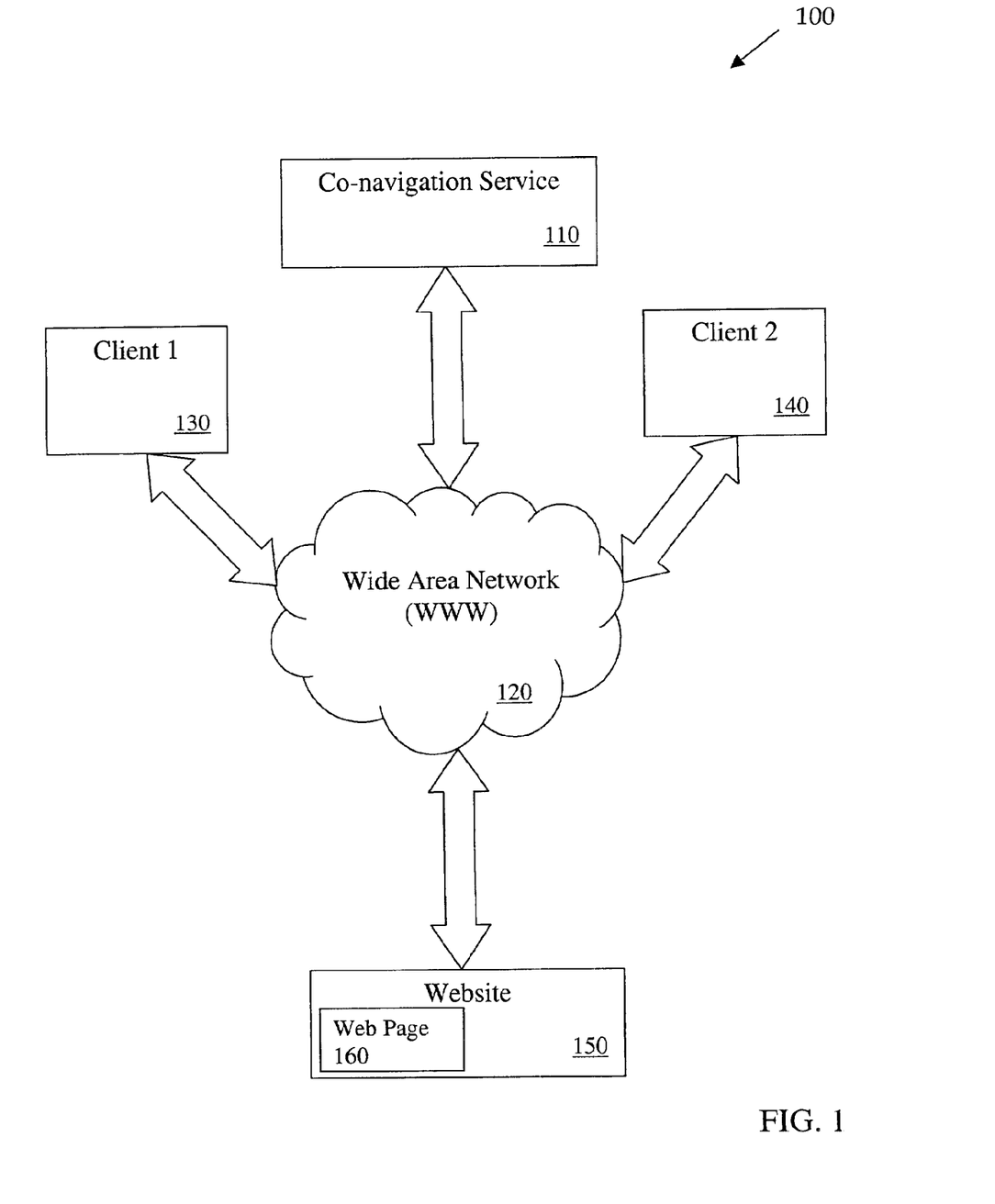
FIG. 1 is a block diagram of one embodiment for a network architecture.

FIG. 1 is a block diagram of one embodiment for a network architecture. In this embodiment, co-navigation service 110 is coupled to wide area network 120. Wide area network 120 may include, for example, the Internet, America On-Line™, CompuServe™, Microsoft Network™, or Prodigy™. In addition, wide area network 120 may include, for example, conventional network backbones, long-haul telephone lines, Internet service providers, or various levels of network routers. Using conventional network protocols, co-navigation service 110 may communicate through wide area network 110 to a plurality of clients and to various web sites.

In one embodiment, co-navigation service 110 communicates to clients 130 and 140 and a web site 150. Clients 130 and 140 represent any device that may enable user's access to data. For simplicity, FIG. 1 shows only two clients, client 130 and client 140, that can communicate to co-navigation service 110. However, it will be recognized by one of ordinary skill in the art that co-navigation service 110 may communicate to a various number of clients and that a wide variety of client devices may be used with this invention without loss of generality. Such devices may include, for example, a conventional computer system, a network computer or thin client device (e.g., WebTV Networks™ Internet terminal or Oracle™ NC), a laptop or palm-top computing device (e.g., Palm Pilot™), a digital consumer device (e.g., a digital TV, a digital camcorder, or a "kitchen" computer"), etc. In one embodiment, clients 130 and 140 may have a Graphical User Interface (GUI) to allow users to access data. GUIs may include, for example, Microsoft Windows, Apple Macintosh, UNIX Motif, or UNIX OPEN-LOOK. Clients 130 and 140 may be connected to co-navigation service 110 and web site 150 in various ways. In one embodiment, clients 130 and 140 may be connected to co-navigation service 110 and web site 150 through wide area network 120. In an alternate embodiment (not shown in FIG. 1), a client, such as client 130 or client 140, may be directly connected to co-navigation service 110 or through a modem in a conventional way. In yet another embodiment, any or all the clients can communicate with co-navigation service 120 and web site 150 via a wireless carrier. In one embodiment, any client may be a part of an organization's internal network which may be protected from external access by a firewall.

In one embodiment, when the World-Wide Web (WWW) portion of the Internet is used for wide area network 120, the HTTP, HTTPS, TCIP/IP and UDP protocols and a web-based programming language, such as HTML, JavaScript, DHTML, VBScript, Active X, Applet, Flash, XML, XSL, may be used to communicate data between web site 150, co-navigation service 110 and clients 130 and 140. In this configuration, clients 130 and 140 may use a client application program known as a web browser such as the Netscape™ Navigator™ published by Netscape Corporation of Mountain View, Calif., the Internet Explorer™ published by Microsoft Corporation of Redmond, Wash., the user interface of America On-Line™, or the web browser or a web language translator of any other conventional supplier. Using such conventional browsers and the World-Wide Web, clients 130 and 140 may access graphical and textual data or video, audio, or tactile data provided by web site 150 and/or co-navigation service 110. Conventional means exist by which clients 130 and 140 may supply information to web site 150 and/or co-navigation service 110 through the World-Wide Web 120 and web site 150 and co-navigation service 110 may return processed data to clients 130 and 140.

A web site 150 represents any remote web site having a collection of web pages, such as web page 160. In one embodiment, web page 160 has "dynamic content". Dynamic content refers to the web page content that may change each time it is viewed depending on the user input. For example, when the user enters a uniform resource locator (URL) to retrieve a certain web page from web site 150, a different web page may be displayed to the user depending on the user's geographic location, time of day, previous pages viewed by the user, profile of the user, user login, user session, cookie of the user, or any other information previously provided by the user. Dynamic content may be created using both client and server languages, such as HTML, JavaScript, DHTML, VHTML, VBScript, Active X, Applet, Flash, XML, XSL on the client and Servlet,s CGI scripts, etc. on the server. Additionally, the web page dynamic content may be dependent on data retrieved from a user cookie. A cookie represents a small amount of "persistent" information, which is generated by a web server and is stored on the computer of the user when the user requests a web page from the server. Subsequently, each time the user sends a request for information to this web server, the cookie is sent back to the server along with the user request. The cookie may be used to prepare customized web pages, identify users, or identify user sessions. For instance, when the user enters web site 150, the user may be asked to fill out a form providing such information as user name and interests. When the user submits this information, a cookie is sent to the user computer and stored there for later use. The next time the user goes to web site 150, the cookie is sent to web site 150 which uses it to present the user with a customized web page. So, for example, instead of seeing just a generic welcome page, the user might see a welcome page with his or her name on it. Cookies can also be used to help enable shopping carts, logins, etc.

When client 130 wishes to initiate a co-navigation session pertaining to web page 160 with another client (e.g., client 140), current co-browsing techniques fail to provide co-navigation of dynamic portions of web page 160. The current techniques typically use "URL pushing" to enable co-browsing of a web page. URL pushing initiates a co-browsing session by allowing one user to "push" (i.e., send) a web page to another user. However, when the web site being co-browsed includes POST commands (which are used to provide a higher level of security), URL pushing fails because different web pages have identical URLs, relying on data passed to the server outside the URL to determine the content. Other major limitations of URL pushing technology include inability to provide synchronized co-navigation of web pages and secured exchange of data (e.g., using the secure socket layer (SSL) technology) between participants of the co-navigation session, as well as inability to jointly fill web forms, to display web pages with personalized content to multiple participants, and to support cookies.

The present invention overcomes the above limitations by using co-navigation service 110 that acts as a proxy between the participants of a co-navigation session and web site 150. Specifically, when a client (e.g., client 130) sends a message indicating a willingness to begin a shared session, co-navigation service 110 receives this message, activates the shared session between client 130 and another client (e.g., client 140), and enables co-navigation of one or more web pages 160 by the clients 130 and 140 during the shared session. In one embodiment, the shared session may be activated between more than two clients. In one embodiment, the participants may include one or more customers and one or more customer service representatives or sales agents.

Figure 2:
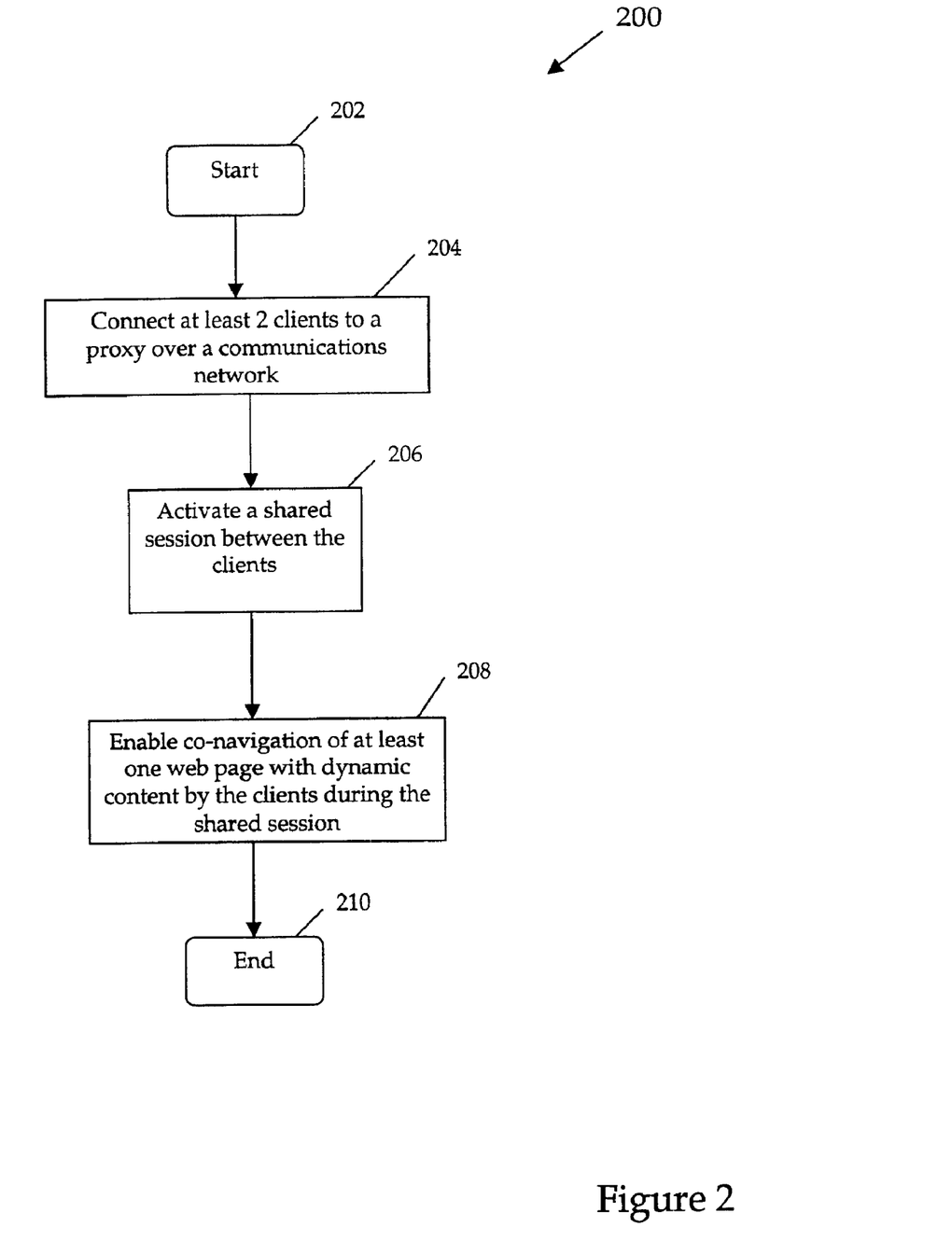
FIG. 2 is a flow diagram of one embodiment of a process for exchanging information over a communications network.

FIG. 2 is a flow diagram of one embodiment of a process for exchanging information over a communications network. The process is performed by processing logic, which may comprise hardware, software, or a combination of both. The processing logic may be either in the computer systems of clients 130 and 140 and co-navigation service 110, or partially or entirely in a separate device and/or system(s).

Referring to FIG. 2, the process begins with connecting two or more clients to a proxy over a communications network (processing block 204). The proxy may be co-navigation service 110, which acts as an intermediary between the clients and a remote web site, and is capable of generating web pages. In one embodiment, the clients are connected to the proxy upon receiving a message from one client indicating a willingness to co-navigate a web page. For instance, if the client encounters a problem while performing some online activity pertaining to a web page (e.g., filling a web form), the client may ask for help (e.g., by clicking on a "Help" button), thereby indicating his or her willingness to initiate a shared session with another client. In this example, the client asking for help may be a customer, and the client providing help may be a customer service representative (CSR).

At processing block 206, a shared session between the clients is activated. In one embodiment, the activation process includes collecting client state information and storing this information for use during the shared session. The client state information may include a client cookie, a URL of a current web page displayed to the client, information entered into a form on that page, and any information from this web page that can be used during the shared session. For example, if the client encounters a problem while shopping online, the information indicating what items the client has already purchased may be collected and stored for use during the shared session. The activation process will be described in more detail below in conjunction with FIG. 5.

At processing block 208, processing logic in co-navigation service 110 enables co-navigation of one or more web documents with web content by the clients during the shared session. Web documents include web pages, word files, pdf files, flash files, etc. As discussed above, co-navigation may include jointly filling online forms, viewing online product demonstrations, cycling through online transactions, etc. Various co-navigation features will be discussed in more detail below.

Architecture of a Co-Navigation System

A co-navigation system such as co-navigation system 110 of FIG. 1 activates a shared session between two or more clients and then acts as an intermediary between the clients and a remote web site in maintaining the shared session, during which the clients perform joint online activity pertaining to one or more web page retrieved from the remote web site. One embodiment of an architecture of a co-navigation system is illustrated in FIG. 3.

Figure 3:
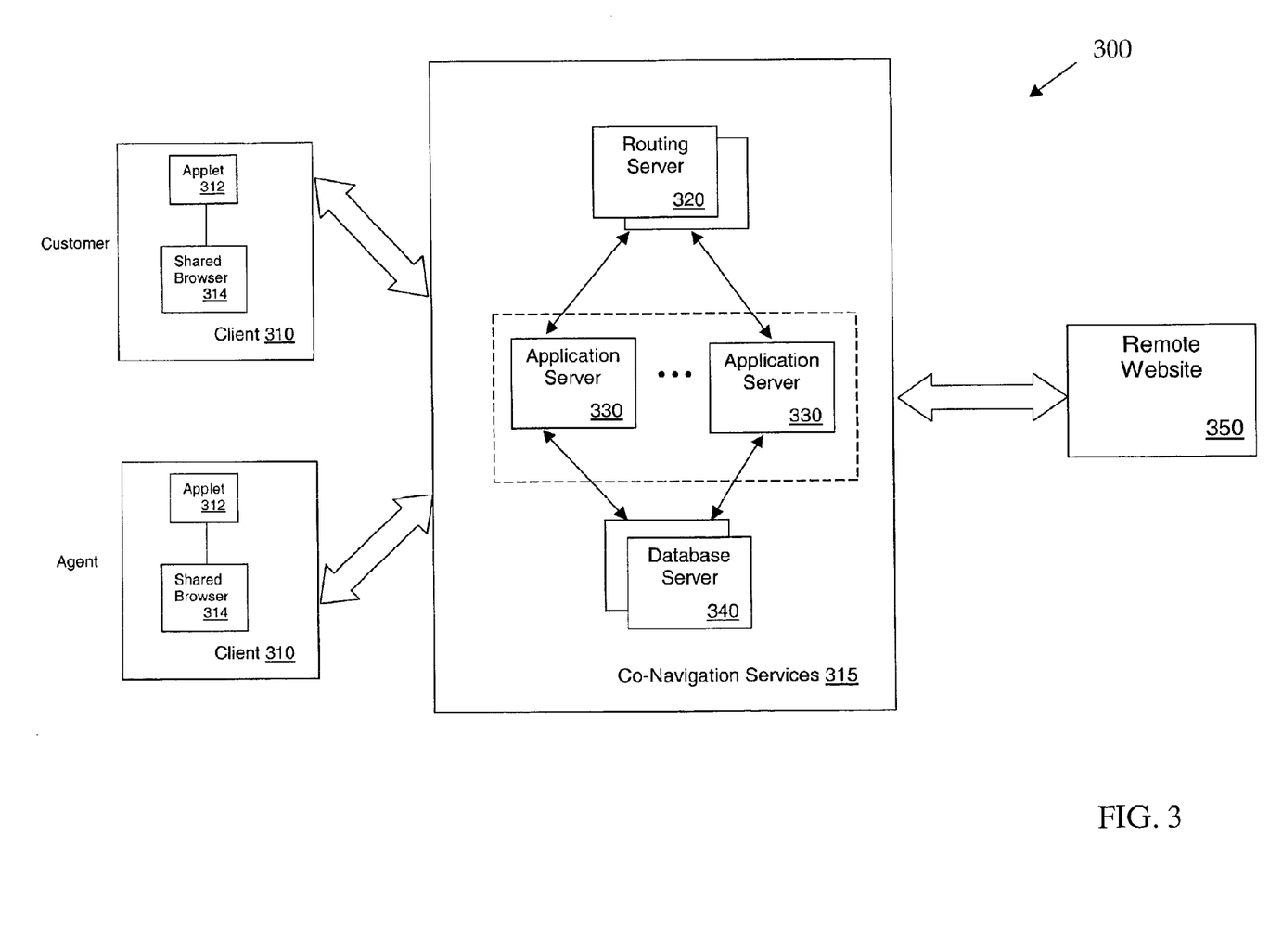
FIG. 3 is a block diagram of one embodiment for an architecture of a co-navigation system.

Referring to FIG. 3, co-navigation system 300 includes software residing on each client 310 and several server-based systems characterized as co-navigation service 315. Client software consists of two components—applet 312 and shared browser 314. Applet 312 is responsible for establishing the connection to co-navigation service 315 and managing the details of the co-navigation session. Shared browser 314 provides communication between client 310 and co-navigation service 315 during the co-navigation session. In one embodiment, both applet 312 and shared browser 314 operate within a strict security protocol (i.e., the Java sandbox).

In one embodiment, applet 312 is dynamically launched on client 310 when client 310 is connected to co-navigation service 315 and shared browser 314 is launched when the co-navigation session begins. In this embodiment, the client software is not persistent on client 310. When the co-navigation session ends, the client software removes itself from client 310. In one embodiment, more than two clients may participate in a shared session. These clients may include one or more customers and one or more CSRs. In this embodiment, each client includes applet 312 and shared browser 314, both of which may be dynamically launched and then removed from each client after the shared session ends.

Co-navigation service 315 includes one or more routing servers 320, one or more application servers 330 and one or more database servers 340. Routing server 320 manages web requests, load balancing, and routing. Routing server 320 is primarily responsible for setting up the co-navigation sessions, i.e., connecting various users to a specific application server 330. Routing implementation may be based on capacity planning and a configurable software router. In addition, routine implementation may be extended to utilize dynamic load balancing and a broader set of routing business rules, such as geography, company, specific company representatives, co-navigation session details, etc.

Application servers 330 are responsible for identifying clients wishing to co-navigate and connecting them in a shared session. Some of the functions performed by each application server 330 include managing shared sessions and processing system events, synchronizing participants within shared sessions, and providing various co-navigation features used to perform online activity pertaining to web pages retrieved from remote web site 350 during shared sessions. One embodiment of the application server architecture is discussed in greater detail in conjunction with FIGS. 4A–4C.

Database server 340 stores all of the persistent data and is responsible for login authentication and storage of metrics. In one embodiment, login authentication is performed by authenticating the participants as either registered users or guests upon establishing a connection between client 310 and co-navigation service 315. Registered users may be required to enter a username and password to login to co-navigation service 315, while guest users may receive temporary usernames and do not need to enter a password. In one embodiment, database server 340 securely stores usernames and passwords in an encrypted form.

At the end of each co-navigation session, application server 330 connects to database server 340 to store the data associated with the session (e.g., session time, specific URLs traversed, number of session participants, etc.). This information may then be used to produce various reports for web sites to assists in their sales and customer service evaluations.

It should be understood by one of ordinary skill in the art that the above components of co-navigation system 300 are shown merely to illustrate the functions performed by co-navigation service 300. That is, co-navigation service 300 may have more or less components than the components shown in FIG. 3.

Figure 4A:
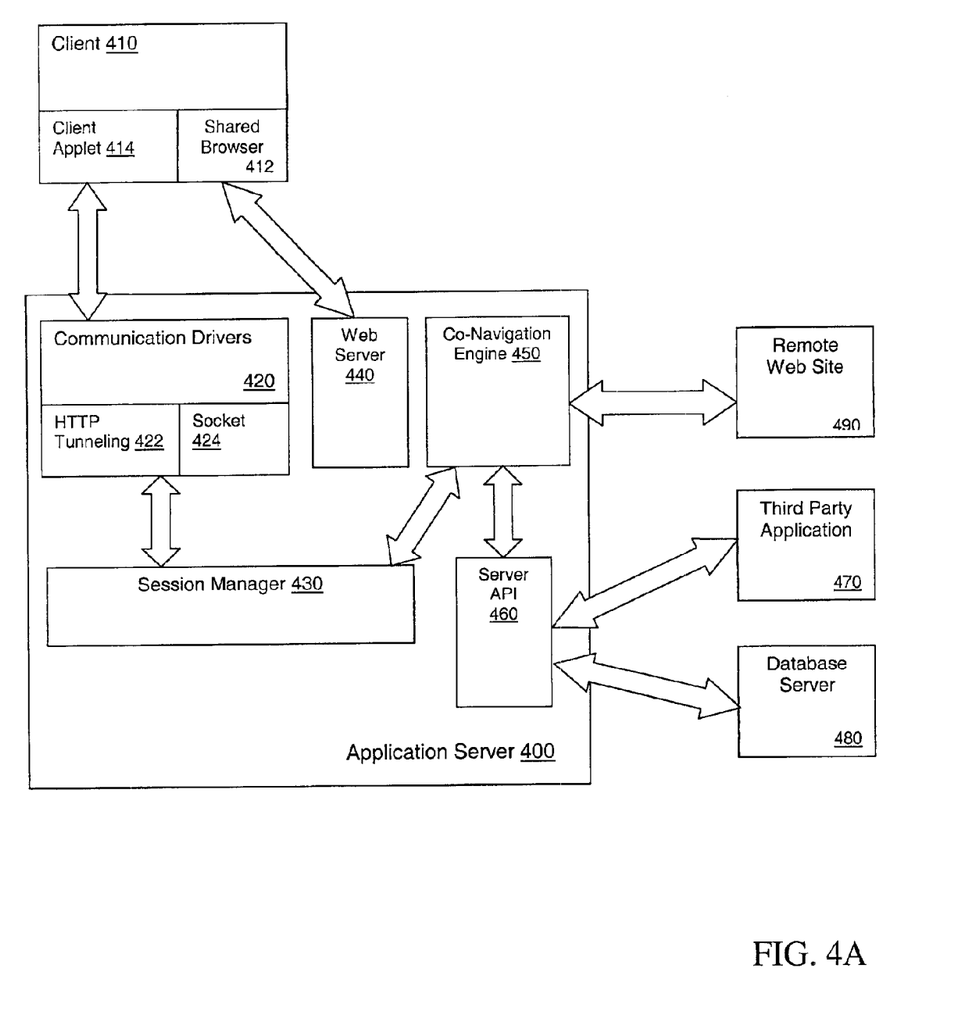
FIG. 4A is a block diagram for an architecture of an application server of a co-navigation system, according to one embodiment of the present invention.
Figure 4B:
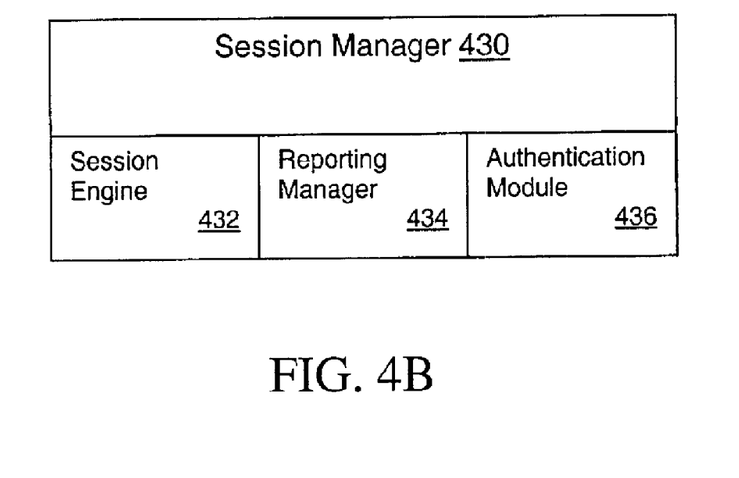
FIGS. 4B–4C are block diagrams of components of the application server of FIG. 4A, according to one embodiment of the present invention.
Figure 4C:
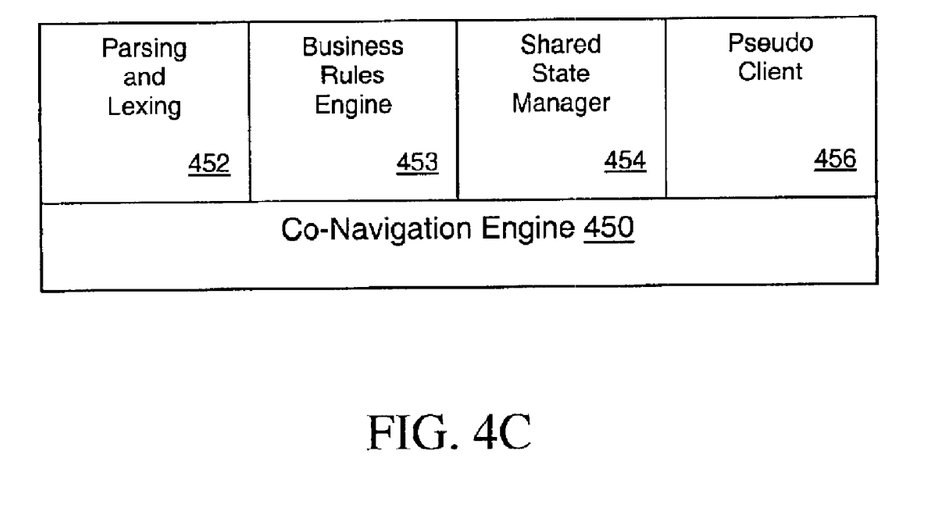

Architecture of an application server will now be described in more detail. FIGS. 4A–4C are block diagrams for the application server architecture, according to one embodiment of the present invention.

Referring to FIG. 4A, application server 400 includes communication drivers 420, session manager 430, web server 440, co-navigation engine 450, and server application interfaces (APIs) 460. Communication drivers 420 ensure that client applet 312 of FIG. 3 efficiently connects to application server 400. This client-to-server link is established in one of two ways: HTTP/HTTPS tunneling 422 or a socket connection 424. In one embodiment, these approaches are attempted simultaneously. If socket connection 424 is successful, then it is used. If socket connection 424 fails for some reason, then standard HTTP tunneling 422 is used. Socket connection 424 is preferred because it does not require periodic polling (unlike HTTP tunneling). HTTP tunneling 422 may be used for connections with clients behind firewalls because firewalls can be configured to block the port which enables socket connection 424.

Session manager 430 is responsible for establishing and maintaining co-navigation sessions. FIG. 4B illustrates three components of session manager 430 which are session engine 432, reporting manager 434, and authentication module 436. Session engine 432 ensures that all of the shared sessions perform correctly. This module manages the creation and administration of the shared sessions, and keeps track of which clients are in specific sessions. Session engine 432 also coordinates the exchange of system messages with other application server modules. In addition, session engine 432 ensures that the appropriate information is stored and the security of the sessions is not compromised.

Reporting manager 434 stores data associated with the co-navigation session such as session time, specific URLs traversed, number of session participants, etc. This information is recorded in local memory while the sessions are in progress. This data is thenstored in the database server or delivered to a third-party system 470 via server API 460. In one embodiment, the above data is considered confidential information and is only provided to authorized users.

Authentication module 436 manages all user authentication and security. In one embodiment, to ensure that users are not impersonated, a unique session management key is assigned to each Internet co-navigation session. This session token may, for example, comprise 30 random alphanumeric characters (15 for the user and 15 for the session), providing approximately 150-bit encryption. Each time a link is clicked or text is entered into a web form, authentication module 436 verifies whether the user is a participant of the session using the session management key. If a mismatch occurs, then the associated user is rejected from the system.

Referring again to FIG. 4A, application server 400 also includes a web server 440 that communicates requests between client shared browser 314 of FIG. 3 and co-navigation engine 450. In one embodiment, web server 440 sends all information via SSL security (e.g., 40- or 128-bit encryption).

Co-navigation engine 450 manages all of the co-navigation functionality within a shared session. FIG. 4C illustrates various components of co-navigation engine 450. These components include parsing and lexing engine 452, business rules engine 453, shared state manager 454, and pseudo client 456. Parsing and lexing engine 452 modifies standard web pages to enable their co-navigation during shared sessions. In particular, parsing and lexing engine 452 prepares web pages retrieved from a remote web site 490 to be presented to the clients participating in the shared session and converts responses generated by the clients into standard HTTP-based requests that are then sent to remote web site 490. While preparing a web page for display to the clients, parsing and lexing engine 452 relies on co-navigation rules (referred to as "business rules") specified by business rules engine 453.

Business rules engine 453 maintains a set of business rules that control co-navigation of web pages during the shared session. Business rules reflect companies' legal and corporate policies affecting co-navigation of companies' web sites. In one embodiment, business rules differ depending on a web site being co-navigated. One example would be web applications that request sensitive information from customers such as social security numbers; in these applications, the sensitive information needs to be hidden from the company representative during the co-browsing session. Alternatively, all or part of business rules are common for all companies using co-navigation service 315. For example, in e-commerce applications, companies do not want their customer service agents to complete transactions for customers (the physical world analogy is having a customer service agent sign the credit card receipt on the behalf of a customer); in this scenario, the "submit" button to commit the transaction is visible to the customer but hidden from the customer service agent. In another example, users may need to enter their credit card and/or social security numbers to complete a transaction. This is information that the users most likely would not want the CSR to be able to see. In this scenario, the user would be able to see this information as it is entered, but the CSR would not be able to, due to permissions set on the credit card and/or social security number entry fields.

Business rules engine 453 cooperates with parsing and lexing module 452 to enforce the rules and security constraints. With business rules engine 453, co-navigation service 315 can define and administer company guidelines and policies to allow the company to implement its co-navigation rules without changing the company web site in any way.

Shared state manager 545 stores and manages the dynamic state information used or modified during the shared session. The dynamic state information may include cookies, web page cache, session history, etc. This information is stored in local memory while the shared session is in progress, and then deleted when the session is over.

Pseudo client 456 is a server-side component that emulates a client browser. Pseudo client 456 relays web requests to and from the web site being co-navigated, e.g., web site 350. This module also frequently communicates with parsing and lexing engine 452, where the incoming web pages are modified and new page requests are generated. In one embodiment, pseudo client 456 supports SSL (both 40- and 128-bit encryption) to ensure that the information exchanged with the web site is completely secure.

Returning to FIG. 4A, application server 400 further includes server integration APIs 460 which enable third-party systems to integrate with co-navigation service 315. Server integration APIs 460 provide interfaces that allow to control and monitor the application server software from external applications. Server integration APIs 460 are also used by application server 400 to interact with database server 480.

Co-Navigation Features

Various features provided by co-navigation service 315 will now be described in more detail. As described above, co-navigation service 315 receives a message from client 310 indicating a willingness to initiate a shared session. In one embodiment, a web site may include a button (e.g., a "Help" button) allowing client 310 to request the shared session. Upon receiving the message from client 310, co-navigation service 315 connects this client and other appropriate client(s) (via a shared key known to all clients) to application server 330 using client applets and activates a shared session between the clients. In one embodiment, the shared key that allows a connection of one client to one or other appropriate clients is a random temporary key generated by the server and passed from one client to another. In one embodiment, the clients include at least one customer and at least one customer service agent or sales representative.

Figure 5:
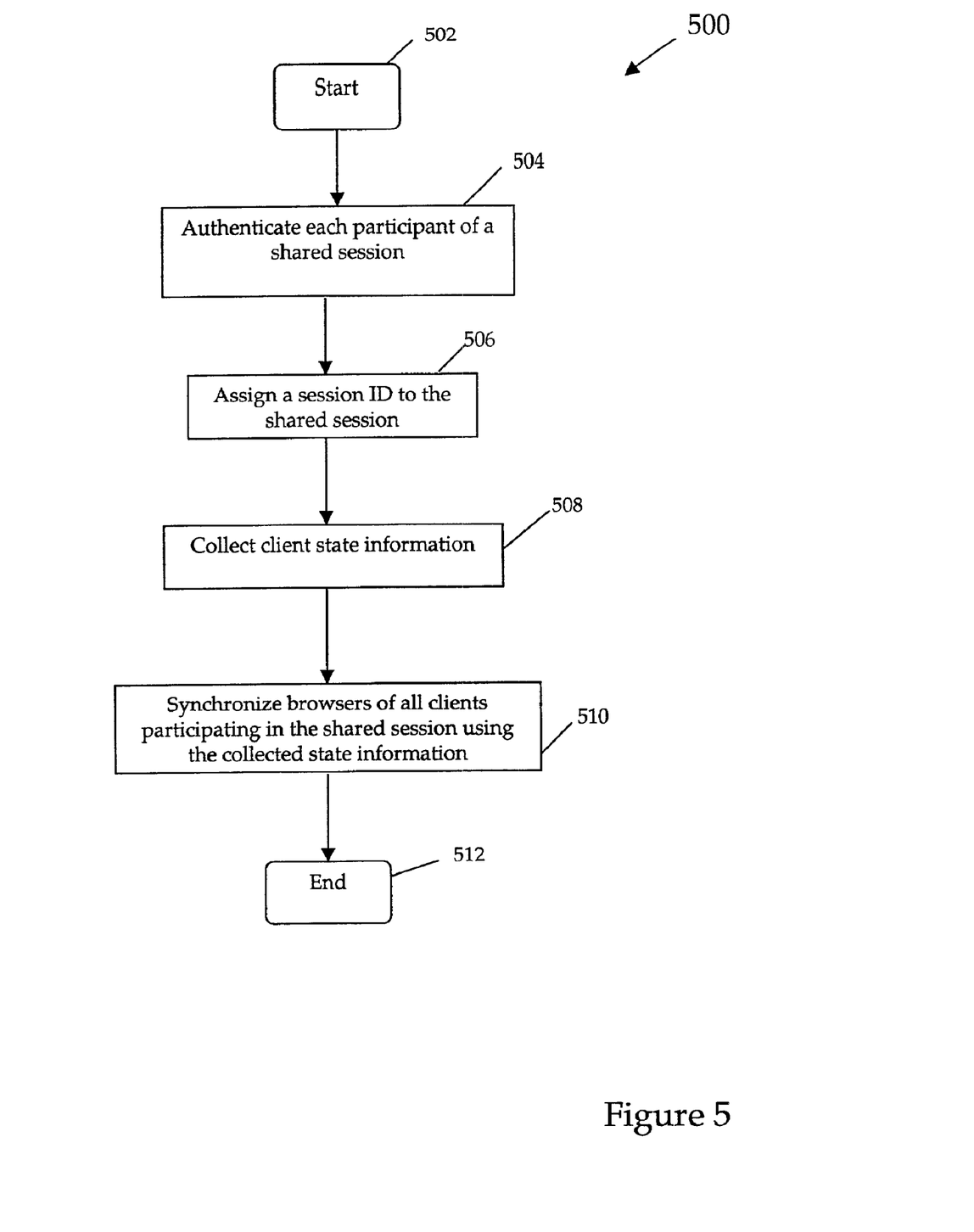
FIG. 5 is a flow diagram of one embodiment of a process for activating a shared session between multiple clients.

FIG. 5 is a flow diagram of one embodiment of a process for activating a shared session between multiple clients. The process is performed by processing logic, which may comprise hardware, software, or a combination of both. The processing logic may be either in the computer systems of clients 310 and co-navigation service 315, or partially or entirely in a separate device and/or system(s).

Referring to FIG. 5, at processing block 504 each participant of a shared session is authenticated (processing block 504). In one embodiment, a participant can be authenticated as either a registered user or a guest. The registered user may be required to enter a user name and password to login to the co-navigation service. A guest user may receive a temporary user name for the session and does not need to enter a password. In one embodiment, the authentication process is triggered by the participant activating a "Help" button located on a web page or other web document.

Next, at processing block 506, a unique session identifier is assigned to the requested shared session. The session identifier is used to ensure that the participants of the shared session are not impersonated. In one embodiment, the session identifier is associated with the participants. Each time an event (e.g., a link is clicked, a button is pushed, or text is entered into a web form) occurs during the shared session, the session identifier is used to verify whether the user initiating the event is a participant of this session. If a mismatch occurs, the user is ejected from the system.

At processing block 508, client state information existing at the time the session is about to begin is collected. The client state information may include client cookie, a URL of a web page currently displayed to the client, any information from the current web page that may pertain to the shared session, the state of any form elements on the page, etc. In one embodiment, the client state information is stored on Application Server 400.

It should be noted that the sequence of steps shown in FIG. 5 can be changed without loss of generality. For instance, processing block 508 may be performed in parallel with processing blocks 504 and 506, or before processing blocks 504 and 506.

Further, at processing block 510, browsers of all the clients participating in the shared session are synchronized using the collected information. That is, all the clients participating in the shared session are presented with the same information as was displayed to the client requesting the shared session at the time he or she made this request.

Figure 6:
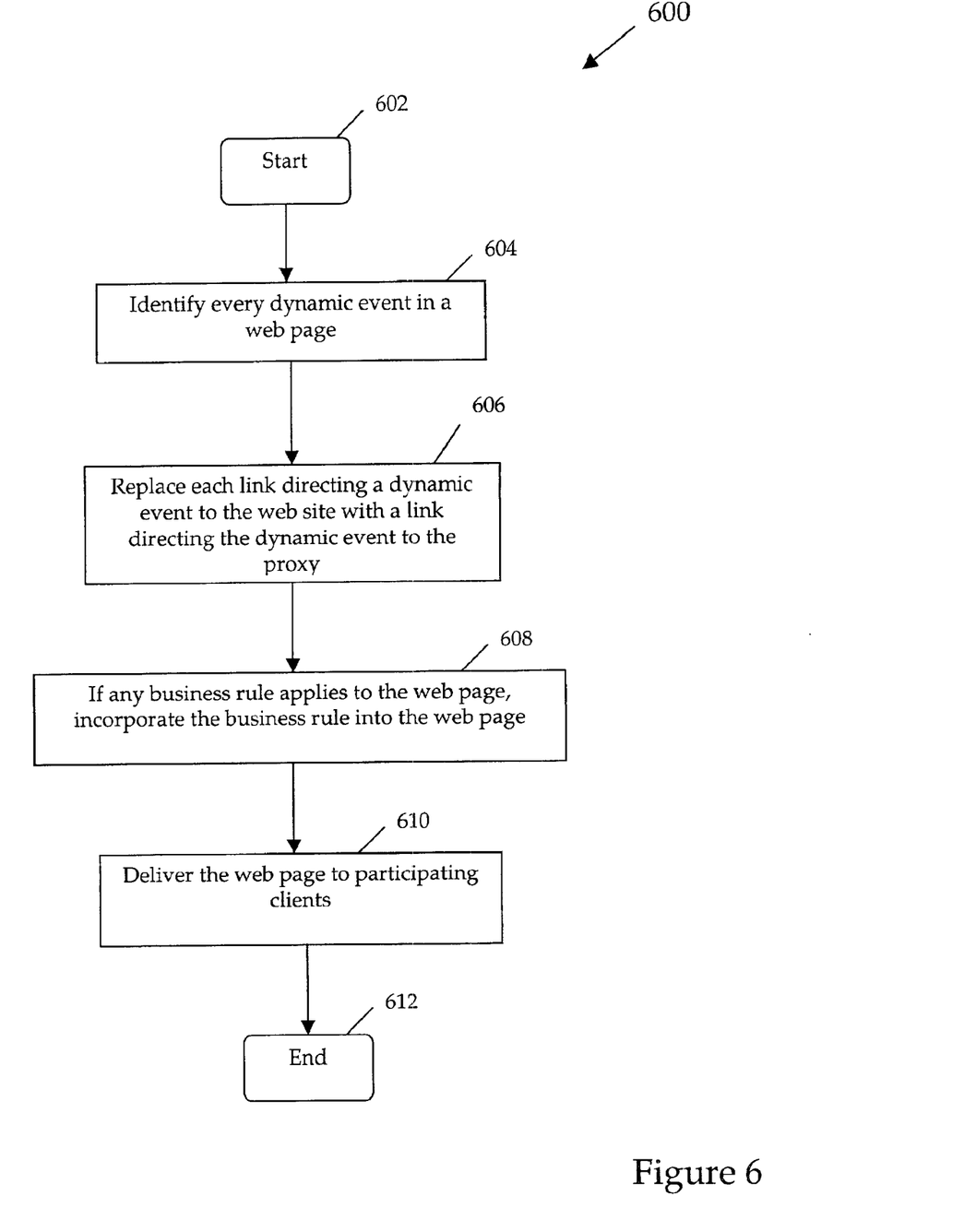
FIG. 6 is a flow diagram of one embodiment of a process for parsing and lexing a web page before presenting the web page to clients participating in a shared session.

Presenting a web page to the participating clients may occur upon activating the shared session as described above. Alternatively, one of the participating clients may request a new web page while the shared session is being conducted (e.g., by entering a new URL or by clicking on a link referring to a new web page). In either embodiment, before the web is presented to the participating clients, it goes through the parsing and lexing process. FIG. 6 is a flow diagram of one embodiment of a process for parsing and lexing a web page before presenting the web page to participants of a shared session. The process is performed by processing logic, which may comprise hardware, software, or a combination of both. The processing logic may be either in the computer systems of clients 310 and co-navigation service 315, or partially or entirely in a separate device and/or system(s).

Referring to FIG. 6, the parsing and lexing process begins with identifying every dynamic event in a web page (processing block 606). Dynamic events include functions within the code of a web page that enable creation of a new web page on the client side by accessing the web site being co-navigated, and various functions within the code of a web page that enable creation of web page portions on the client side without accessing the web site being co-navigated. Some examples of these latter functions are JavaScript methods (e.g., document.write, eval, etc.) which allow users to dynamically create HTML content and links as the web page loads. Other examples may include such HTML functions as onclick and mouseover events. The onclick function may be used to execute JavaScript code when a user clicks a form element or a link. The mouseover function may be used to trigger a change on an item (e.g., a graphic) in a web page when the mouse passes over it. In one embodiment, the JavaScript command "OnChange" or "OnClick" traps actions by both the CSR and the client, and pass them to each other's shared browsers. Examples of this include clicking on links, filling information into a form, and opening pop-up windows.

Next, at processing block 606, each link directing a dynamic event to the web site is replaced with a link directing this dynamic event to the co-navigation service. That is, the parsing and lexing process results in "trapping" every dynamic event within the web page. Accordingly, when a dynamic event subsequently occurs during the shared session, the co-navigation service is aware of this event and can manipulate with it. For instance, when a customer triggers a dynamic event (e.g., by clicking on a link or a form button) during the shared session, the co-navigation service enables display of the resulting web content to all the participating clients.

At processing block 610, processing logic in the co-navigation service incorporates relevant business rules into the web page being modified. As discussed above, business rules reflect companies' legal and corporate policies affecting co-navigation of companies' web sites. In one embodiment, if any business rules apply to the web page being modified, these rules are incorporated into the web site.

Afterwards, at processing block 612, the web page is delivered to all the clients participating in the shared session. Accordingly, before the web page is displayed to the clients, it is modified to trap all dynamic events within the web page and to incorporate the applicable business rules. As a result, synchronized, interactive co-navigation of web content is provided to the participants of the shared session.

In one embodiment, the web page to be displayed is modified to circumvent the framebusting technique used by the creator of the original web page. The framebusting technique is a technique for preventing a display of the creator's content within a frame of a web site of another owner. For example, a web site could provide news to users simply by linking to news articles on another web site, and include these news articles into its own frame with its own advertisements, instead of the frame of the other web site. The actual creator of the web content can prevent this from happening by embedding JavaScript code in its web pages. Specifically, a scripting language may be used that references the top frame in each frame of its web documents, and then checks to see whether the frame being used is the expected frame or whether the frame being used has the expected parent-child relationship to the top frame. If neither of these two conditions is true, the content reloads itself into the top frame. To circumvent the framebusting, processing logic in the co-navigation service replaces all the references to the top frame with a code that does not reference the actual topmost window in the shared browser, but instead references the frame which would be the top window, had the page not been loaded in a co-navigation session. When this is done, the "framebusting" code does not detect a problem, and the conavigation service can place this content within its own frames.

Figure 7:
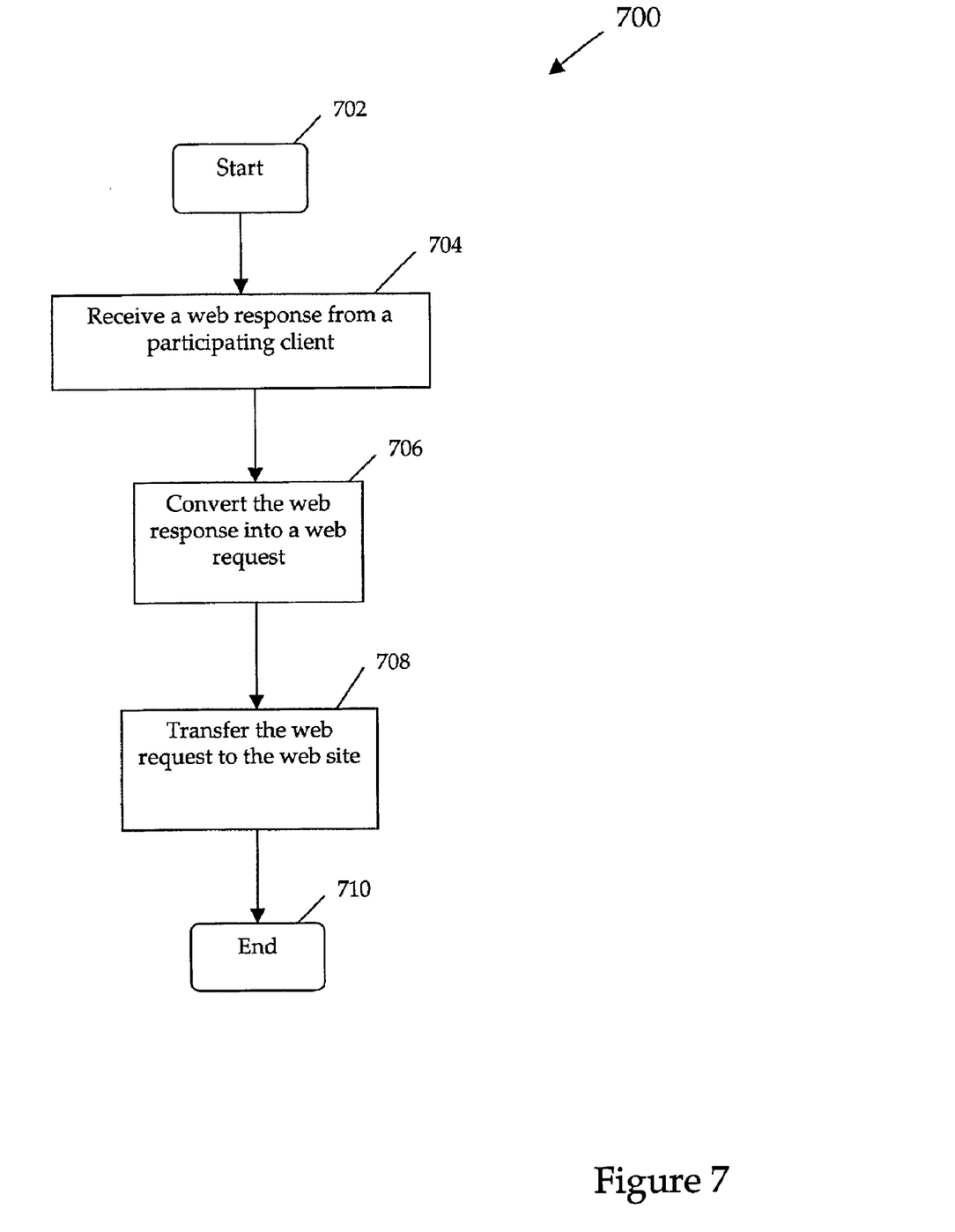
FIG. 7 is a flow diagram of one embodiment of a process for delivering a client response to a web site during a shared session.

When browsing the modified web page or performing any other online activity, a participating client may send a web response to the co-navigation service. For instance, a response may be generated when a participating client clicks on a link that refers to a new web document, enters a URL of a new web page, or triggers a dynamic event in the modified web page.

FIG. 7 is a flow diagram of one embodiment of a process for delivering a client response to a web site. The process begins with receiving a web response from any client participating in the shared session (processing block 704). The web response may include, for example, a request for a web page. At processing block 706, processing logic in the co-navigation service converts the client response into a standard web request (e.g., an http request). Then, the co-navigation service, acting as a client of the web site, transfers this standard web request to the web site (processing block 708).

Figure 8:
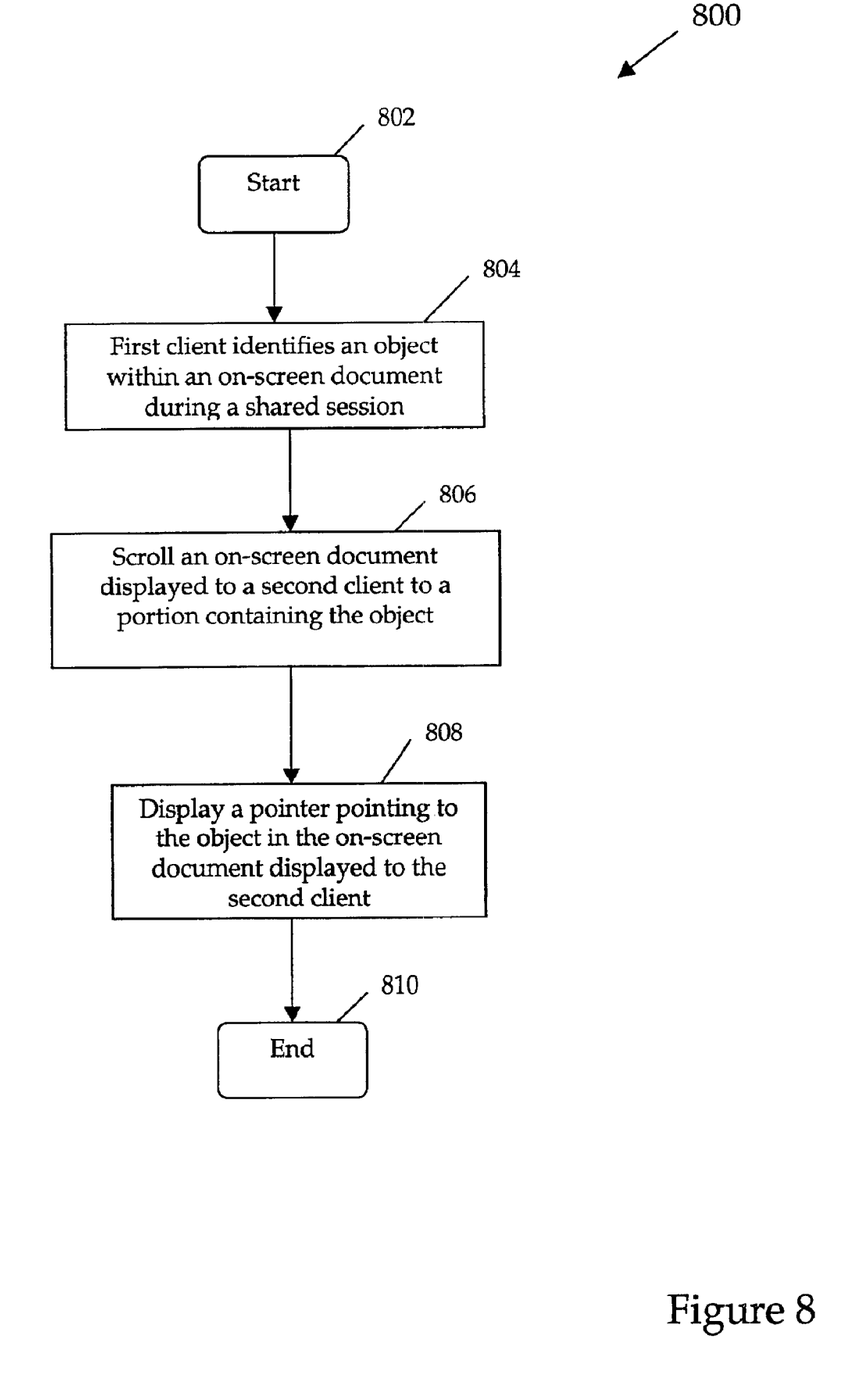
FIG. 8 is a flow diagram of one embodiment of a process for coordinating pointers on display screens of multiple clients during a shared session.

During the co-navigation service, a participating client may want to draw attention of other participants to a particular object (e.g., a word, a form field, etc.) within the displayed web content. FIG. 8 is a flow diagram of one embodiment of a process for coordinating pointers on display screens of multiple clients during a shared session.

Referring to FIG. 8, the process begins by a first client identifying an object of interest on the screen (processing block 804). The object may be a particular word, text, picture, link, etc. In one embodiment, the first client identifies the object by pointing a cursor to the object and clicking on a right mouse button. At processing block 806, on-screen documents displayed to other participants scroll to the location of this object on the other participants' screens. Further, at processing block 808, a pointer pointing to the object identified by the first participant is displayed on the screens of other participants.

Another co-navigation feature is directed to providing back and forward functionality during the shared session. That is, the participants of the shared session have the ability to go back and forward in a co-navigation setting. The co-navigation service may also selectively hide web features from certain participants during the shared session and/or selectively hide personal information of one participant from other participants in the shared session. For instance, certain form fields may be seen by a customer but not by a CSR (e.g., a client social security number or password). Another example, which typically occurs in e-commerce applications, is that companies do not want their customer service agents to complete transactions for customers (the physical world analogy is having a customer service agent sign the credit card receipt on the behalf of a customer); in this scenario, the "submit" button to commit the transaction is visible to the customer but hidden from the customer service agent.

It will be recognized by one of ordinary skill in the art that a variety of co-navigation features other than those described above may be provided using the co-navigation technology of the present invention without loss of generality.

Computer System Architecture

Figure 9:
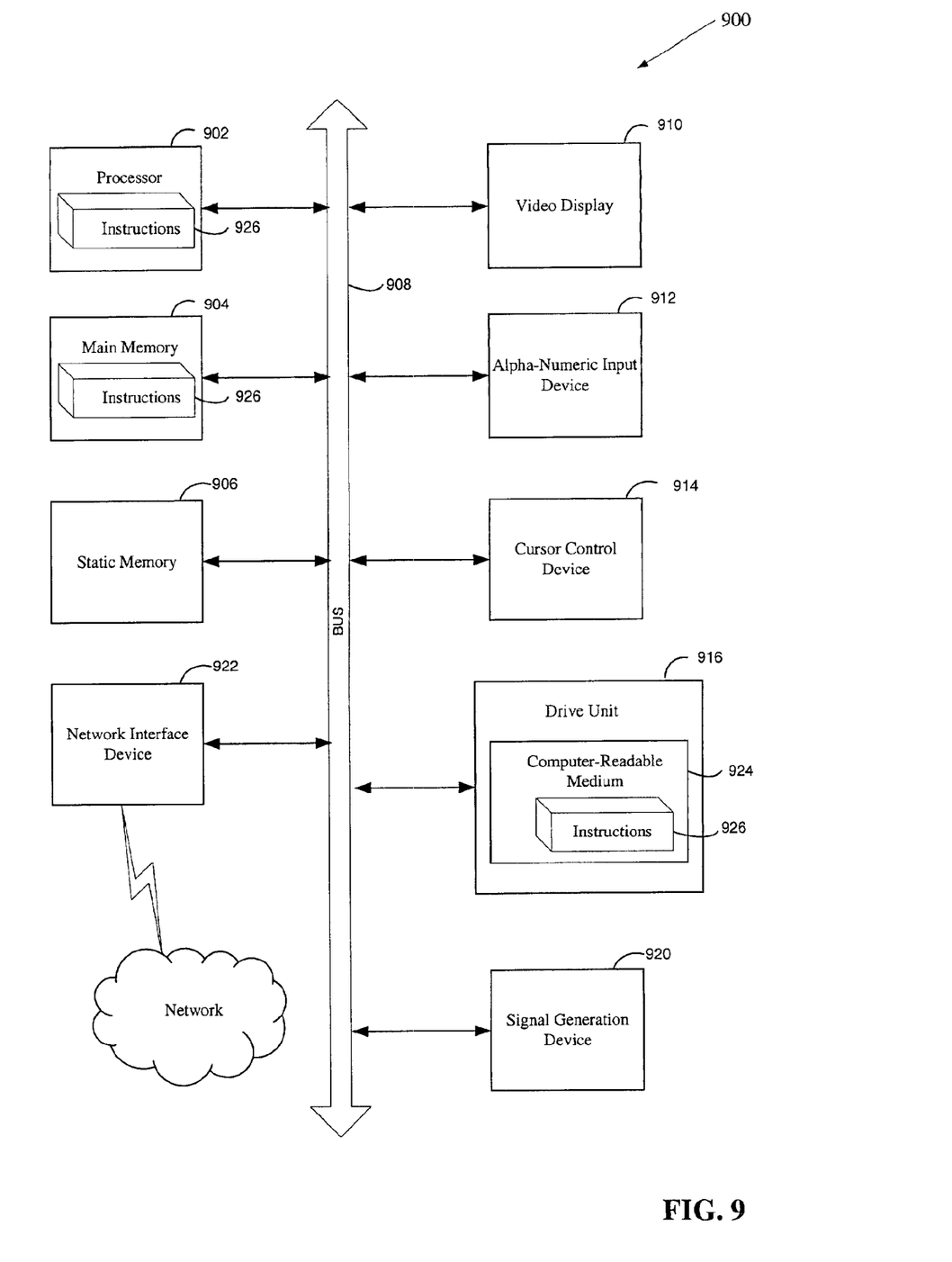
FIG. 9 is a block diagram of one embodiment for an architecture of a computer system.

FIG. 9 shows a diagrammatic representation of machine in the exemplary form of a computer system 1000, within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1000 includes a processor 1002, a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a cursor control device 1014 (e.g., a mouse), a disk drive unit 1016, a signal generation device 1020 (e.g., a speaker) and a network interface device 1022.

The disk drive unit 1016 includes a computer-readable medium 1024 on which is stored a set of instructions (i.e., software) 1026 embodying any one, or all, of the methodologies described above. The software 1026 is also shown to reside, completely or at least partially, within the main memory 1004 and/or within the processor 1002. The software 1026 may further be transmitted or received via the network interface device 1022. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, optical and magnetic disks, and carrier wave signals.

Several variations in the implementation of the method and system for monitoring personal data of subscribers via a wide area network have been described. The specific arrangements and methods described here are illustrative of the principles of this invention. Numerous modifications in form and detail may be made by those skilled in the art without departing from the true spirit and scope of the invention. Although this invention has been shown in relation to a particular embodiment, it should not be considered so limited. Rather it is limited only by the appended claims.

What is claimed is:

1. A method for exchanging information over a communications network, the method comprising:
   connecting at least two clients to a proxy over the communications network;
   activating a shared session between the at least two clients;
   retrieving at least one web document pertaining to the shared session from a web site;
   modifying the at least one web document with dynamic content associated with one or more references to the web site to replace the one or more references to the web site with one or more references to the proxy, the dynamic content depending at least partially on information stored outside of said web site;
   incorporating at least one business rule into the at least one web document if the at least one business rule is applicable to the at least one web document; and
   enabling co-navigation of the at least one web document with the dynamic content by the at least two clients during the shared session.

2. The method of claim 1 wherein the at least two clients include at least one customer and at least one company representative.

3. The method of claim 1 wherein connecting the at least two clients to the proxy includes receiving a message from any of the at least two clients, the message indicating a willingness to begin the shared session.

4. The method of claim 1 wherein activating the shared session between the at least two clients further includes:
   collecting client state information; and
   synchronizing browsers of the at least two clients using the client state information.

5. The method of claim 4 wherein the client state information includes a client cookie, an Internet address of a current web document displayed to a client, and relevant information from the current web document.

6. The method of claim 1 wherein any of the at least two clients is behind a firewall.

7. The method of claim 1 wherein enabling the at least two clients to co-navigate includes:
   presenting the at least one web document to the at least two clients; and
   submitting responses received from any of the at least two clients to the web site.

8. The method of claim 7 wherein submitting responses further includes:
   receiving a web response from any of the at least two clients;
   converting the web response to a web request; and
   transferring the web request to the web site.

9. The method of claim 1 wherein modifying the at least one web document includes:
   identifying a dynamic event in the at least one web document; and
   replacing a link directing the dynamic event to the web site with a link or code directing the dynamic event to a proxy.

10. The method of claim 1 wherein modifying the at least one web document includes replacing all references to a top frame in the web document with a code referencing a frame which would be the top window had the web document not been loaded in a co-navigation session.

11. The method of claim 1 wherein co-navigating includes jointly completing a web form by the at least two clients.

12. The method of claim 1 further comprising:
   a first client specifying an object on a web document displayed to the first client during the shared session; and
   displaying the object on a web document displayed to a second client.

13. The method of claim 12 further comprising scrolling the web document displayed to the second client to a portion of the web document that includes the object.

14. The method of claim 1 further comprising selectively restricting web features from any of the at least two clients during the shared session.

15. The method of claim 1 further comprising selectively enabling web features from any of the at least two clients during the shared session.

16. The method of claim 1 further comprising selectively blocking personal information of a first client from a second client during the shared session.

17. The method of claim 1 wherein co-navigation is performed in a secure manner.

18. The method of claim 1 further comprising providing going back and forward functionality during the shared session.

19. The method of claim 1 wherein any of the at least two clients are connected to the proxy via a wireless carrier.

20. A system for exchanging information over a communications network, the system comprising:

a first client device, connected to the communications network;

a second client device, connected to the communications network, to issue a message indicating a willingness to begin a shared session; and a co-navigation service, connected to the communications network, to receive the message from the second client device, to activate the shared session between at least a user of the first client device and a user of the second client device, to retrieve at least one web document pertaining to the shared session from a web site, to modify the at least one web document modifying the at least one web document with dynamic content associated with one or more references to the web site to replace the one or more references to the web site with one or more references to the proxy, the dynamic content depending at least partially on information stored outside of said web site, to incorporate at least one business rule into the at least one web document if the at least one business rule is applicable to the at least one web document, and to enable co-navigation of the at least one web document with the dynamic content by at least the user of the first client device and the user of the second client device during the shared session.

21. The system of claim 20 wherein the user of the first client device is a company representative, and the user of the second client device is a customer.

22. The system of claim 20 wherein each of the first client device and the second client device comprises:

an applet to establish connection with the co-navigation service; and a shared browser to present the at least one web document to a user.

23. The system of claim 20 wherein the co-navigation service comprises:

a routing server to manage web requests, load balancing and routing;

at least one application server to maintain a plurality of shared sessions; and a database server to authenticate participants of the plurality of shared sessions and store information related to each of the plurality of shared sessions.

24. The system of claim 23 wherein each application server includes:

communication drivers to maintain connection between the application server and each of a plurality of client devices during a corresponding shared session;

a session manager to establish and coordinate the plurality of shared sessions;

a web server to transfer requests from the co-navigation service to corresponding client devices;

a co-navigation engine to provide co-navigation functionality during the shared session; and at least one server integration application programming interface (API) to provide an interface between the co-navigation service and at least one third party system.

25. The system of claim 24 wherein the co-navigation engine further includes:

a parsing and lexing engine to retrieve web documents from a web site, to prepare the web documents for display to corresponding participants of the shared session, and to submit responses received from any of the participants to a web site;

a business rule engine to maintain a plurality of predefined business rules pertaining to co-navigation, the plurality of predefined business rules being used in preparing the web documents for display during the shared session;

a shared state manager to maintain state information during the shared session; and a pseudo client to retrieve web documents from web sites and to send requests to the web sites.

26. The system of claim 25 wherein the parsing and lexing engine is capable of identifying every dynamic event in the web document, replacing links directing dynamic events to the web site with links directing the dynamic events to the proxy, and modifying the web document according to predefined business rules.

27. The system of claim 25 wherein the co-navigation engine is configured to provide joint completion of a web form by participants of the shared session.

28. The system of claim 20 wherein co-navigation is performed in a secure manner.

29. The system of claim 20 wherein any of the client devices are connected to the co-navigation service via a wireless carrier.

30. A computer readable medium comprising instructions, which when executed on a processor, perform a method for exchanging information over a communications network, the method comprising:

connecting at least two clients to a proxy over the communications network;

activating a shared session between the at least two clients;

retrieving at least one web document pertaining to the shared session from a web site;

modifying the at least one web document with dynamic content associated with one or more references to the web site to replace the one or more references to the web site with one or more references to the proxy, the dynamic content depending at least partially on information stored outside of said web site;

incorporating at least one business rule into the at least one web document if the at least one business rule is applicable to the at least one web document; and enabling co-navigation of the at least one web document with the dynamic content by the at least two clients during the shared session.

* * * * *